United States Patent [19]

Munk

[11] Patent Number: 4,923,911

[45] Date of Patent: May 8, 1990

[54] CURABLE MIXTURES

[75] Inventor: Kurt Munk, Grenzach, Fed. Rep. of Germany

[73] Assignee: Ciba-Geigy Corporation, Ardsley, N.Y.

[21] Appl. No.: 285,678

[22] Filed: Dec. 16, 1988

[30] Foreign Application Priority Data

Dec. 29, 1987 [CH] Switzerland .......................... 5090/87

[51] Int. Cl.$^5$ ............................................ C08G 59/68
[52] U.S. Cl. ................................... 523/457; 523/466; 528/92; 528/365; 548/101; 556/134
[58] Field of Search ................. 528/92, 365; 523/457, 523/466

[56] References Cited

U.S. PATENT DOCUMENTS

| | | | |
|---|---|---|---|
| 2,803,609 | 8/1957 | Schlenker | 528/92 |
| 3,484,398 | 12/1969 | Childs | 528/92 X |
| 4,013,987 | 3/1977 | Foster | 528/92 X |
| 4,638,021 | 1/1987 | Ando et al. | 528/92 X |

FOREIGN PATENT DOCUMENTS

| | | |
|---|---|---|
| 50-140600 | 11/1975 | Japan . |
| 60-123526 | 7/1985 | Japan . |
| 60-190417 | 9/1985 | Japan . |
| 1422907 | 1/1976 | United Kingdom . |

OTHER PUBLICATIONS

Kobunshi Kagaku, vol. 30, No. 335, pp. 121–125 (Mar. 1973).

*Primary Examiner*—Earl Nielsen
*Attorney, Agent, or Firm*—Stephen V. O'Brien

[57] ABSTRACT

Curable mixtures comprising
(a) at least one epoxy resin containing on average more than one, 1,2-epoxy group per molecule,
(b) at least one cyclic carboxylic anhydride,
(c) an adduct of a zinc salt of a $C_6$-$C_{18}$carboxylic acid with a tertiary amine, and
(d) optionally a filler and/or further conventional modifiers have a long pot life without impairment of the brief curing time at elevated temperatures.

20 Claims, No Drawings

CURABLE MIXTURES

The present invention relates to curable mixtures comprising polyepoxides, carboxylic anhydrides, an adduct of a zinc salt of a carboxylic acid with a tertiary amine as latency enhancer, and optional fillers and/or conventional modifiers, and to the reaction products themselves and the use thereof as latent accelerators for said curable mixtures.

Mixtures of a zinc compound and an amine that carries at least one stearyl radical at the nitrogen are disclosed as catalysts for heat-curable epoxy resin/anhydride systems in German Offenlegungsschrift 2 321 004. Mixtures comprising epoxy resin, acid anhydride, catalyst, for example a metal salt of a carboxylic acid or tertiary amine, and fillers, are disclosed in Japanese Patent Kokai Sho 60-123 526.

Japanese Patent Kokai Sho 60-190 417 also teaches the use of a mixture of a tertiary amine and a transition metal salt of a carboxylic acid as cyclisation catalyst for polyepoxide/polyisocyanate systems. An adduct of a tertiary amine and a carboxylic acid salt can also be used.

Epoxy resin compositions for prepegs that contain an amine and a metal salt of a carboxylic acid as hardener are also disclosed in Japanese patent application 50-140 600.

The curing of an epoxy resin with methyltetrahydrophthalic anhydride in the presence of benzyl dimethylamine and zinc caprylate is disclosed in Kobunshi Kagaku 30 (1973), 121-125.

The present invention relates to curable mixtures comprising
(a) at least one epoxy resin containing on average more than one 1,2-epoxy group per molecule,
(b) at least one cyclic carboxylic anhydride,
(c) an adduct of a zinc salt of a $C_6$-$C_{18}$ carboxylic acid with a tertiary amine, and
(d) optionally a filler and/or further conventional additives.

The epoxy resins (a) present in the curable mixtures of this invention are preferably polyepoxide compounds, more particularly aliphatic, cycloaliphatic or aromatic polyepoxides, or mixtures thereof, that contain on average at least two 1,2-epoxy groups per molecule.

Suitable epoxy resins (a) are all types of epoxy resins, for example those that contain groups of formula

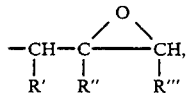

wherein either R' and R''' are each a hydrogen atom, in which case R'' is a hydrogen atom or a methyl group, or R' and R''', when taken together, are —CH$_2$CH$_2$— or —CH$_2$CH$_2$CH$_2$—, in which case R'' is a hydrogen atom, which groups are attached direct to oxygen, nitrogen or sulfur atoms.

Representative examples of such resins are polyglycidyl esters and poly($\beta$-methylglycidyl) esters which can be obtained by reaction of a compound containing two or more carboxylic acid groups per molecule with epichlorohydrin, glycerol dichlorohydrin or $\beta$-methylepichlorohydrin in the presence of alkali. Such polyglycidyl esters may be derived from aliphatic polycarboxylic acids, for example oxalic acid, succinic acid, glutaric acid, adipic acid, pimelic acid, suberic acid, azelaic acid, sebacic acid or dimerised or trimerised linoleic acid, from cycloaliphatic polycarboxylic acids such as tetrahydrophthalic acid, 4-methyltetrahydrophthalic acid, hexahydrophthalic acid and 4-methylhexahydrophthalic acid, and from aromatic polycarboxylic acids such as phthalic acid, isophthalic acid and terephthalic acid.

Further examples are polyglycidyl ethers and poly($\beta$-methylglycidyl) ethers, which may be obtained by reacting a compound that contains at least two free alcoholic and/or phenolic hydroxyl groups per molecule with the appropriate epichlorohydrin under alkaline conditions, or also in the presence of an acid catalyst and subsequent treatment with alkali.

These ethers can be prepared with poly(epichlorohydrin) from acyclic alcohols such as ethylene glycol, diethylene glycol and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol and sorbitol; from cycloaliphatic alcohols such as resorcitol, quinitol, bis(4-hydroxycyclohexyl)methane, 2,2-bis(4-hydroxycyclohexyl)propane and 1,1-bis(4-hydroxymethyl)cyclohex-3-ene; and from alcohols containing aromatic nuclei, such as N,N-bis(2-hydroxyethyl)aniline and p,p'-bis(2-hydroxyethylamino)diphenylmethane. The ethers can also be prepared from mononuclear phenols such as resorcinol and hydroquinone, as well as from polynuclear phenols such as bis(4-hydroxyphenyl)methane, 4,4-dihydroxydiphenyl, bis(4-hydroxyphenyl)-sulfone, 1,1,2,2-tetrakis(4-hydroxyphenyl)ethane, 2,2-bis(4-hydroxyphenyl)propane (otherwise known as bisphenol A), and 2,2-bis(3,5-dibromo-4-hydroxyphenyl)propane, as well as from novolaks obtained from aldehydes such as formaldehyde, acetaldehyde, chloral and furfurol, with phenols such as phenol itself and phenol which is ring-substituted by chlorine atoms or alkyl groups each containing up to 9 carbon atoms, for example 4-chlorophenol, 2-methylphenol and 4-tert-butylphenol.

Suitable poly(N-glycidyl) compounds comprise, for example, those products obtained by dehydrochlorination of adducts of epichlorohydrin with amines containing at least two active hydrogen atoms bonded to amino nitrogen atoms. Examples of suitable amines are: aniline, n-butylamine, bis(4-aminophenyl)methane and bis(4-methylaminophenyl)methane. Further suitable compounds are: triglycidyl isocyanurate and N,N'-diglycidyl derivatives of cyclic alkylene ureas such as ethylene urea and 1,3-propylene urea, and hydantoins such as 5,5-dimethylhydantoin.

Examples of poly(S-glycidyl) compounds are the di-S-glycidyl derivatives of dithiols such as ethanol-1,2-dithiol and bis(4-mercaptomethylphenyl) ether.

Examples of epoxy resins containing groups of formula

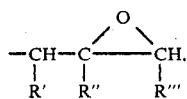

wherein R' and R''', when taken together, are a —CH$_2$CH$_2$— group, are bis(2,3-epoxycyclopentyl)e- ther, 2,3-epoxycyclopentylglycidyl ether, 1,2-bis(2,3-epoxycyclopentyloxy)ethane and 3,4-epoxycyclohexyl-methyl-3',4'-epoxycyclohexanecarboxylate.

Suitable epoxy resins are also those in which the 1,2-epoxy groups are attached to hetero atoms of different kind, for example the N,N-O-triglycidyl derivative of 4-aminophenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

The cyclic carboxylic anhydride (b) of the curable mixtures of this invention is preferably an alicyclic simple or polycyclic anhydride, an aromatic anhydride or a chlorinated or brominated anhydride.

Typical examples of alicyclic simple anhydrides are: succinic anhydride, citraconic anhydride, itaconic anhydride, alkenyl-substituted succinic anhydrides, dodecenylsuccinic anhydride, maleic anhydride and tricarballylic anhydride.

Typical examples of alicyclic polycyclic anhydrides are: the adduct of maleic anhydride with methylcyclopentadiene, the adduct of linoleic acid with maleic anhydride, alkylated endoalkylenetetrahydrophthalic anhydrides, hexahydrophthalic anhydride, methyltetrahydrophthalic anhydride, tetrahydrophthalic anhydride, the isomeric mixtures of which two last mentioned anhydrides are especially suitable. Hexahydrophthalic anhydride is also preferred.

Examples of aromatic anhydrides are: pyromellitic anhydride, trimellitic anhydride and phthalic anhydride.

Examples of chlorinated or brominated anhydrides are: tetrachlorophthalic anhydride, tetrabromophthalic anhydride, dichloromaleic anhydride and chlorendic anhydride.

It is preferred to use liquid or low melting dicarboxylic acid anhydrides in the curable mixtures of this invention.

Preferred curable mixtures are those wherein the carboxylic anhydride is an alicyclic simple or polycyclic anhydride, most preferably hexahydrophthalic anhydride, methyltetrahydrophthalic anhydride and the mixture of isomers thereof.

Interesting curable mixtures are also those wherein the cyclic carboxylic anhydride is an aromatic anhydride.

Further interesting curable mixtures are those wherein the cyclic carboxylic anhydride is a chlorinated or brominated anhydride.

The tertiary amine in the adduct (c) of the curable mixtures of this invention may preferably be an amine of formula I, II or III

$$N(R^1)(R^2)(R^3) \quad (I)$$

$$(R^4)(R^5)N-A-N(R^6)(R^7) \quad (II)$$

(III)

wherein $R^1$, $R^2$, $R^4$ and $R^6$ are each independently of one another $C_1-C_{12}$-alkyl, $R^3$, $R^5$ and $R^7$ are $C_1-C_{12}$alkyl, unsubstituted or substituted phenyl, benzyl, phenylethyl, cyclopentyl or cyclohexyl, or $R^2$ and $R^3$, when taken together, are $-(CH_2)_p-$, in which p is 4 or 5, $-(CH_2)_2-O-(CH_2)_2-$ or $-(CH_2)_2-NH-(CH_2)_2-$, A is $C_1-C_4$alkylene, $R^8$ is hydrogen, $C_1-C_8$alkyl or benzyl, $R^9$ is hydrogen, $C_1-C_{18}$alkyl, benzyl or phenyl, and $R^{10}$ is hydrogen or $C_1-C_4$alkyl. Further, the tertiary amine may be a heterocyclic amine, for example a pyrazole, a triazole, a pyridine, a pyridazine, a dihydropyridazine, a pyrimidine, a dihydropyrimidine, a pyrazine or a dihydropyrazine.

Preferred curable mixtures are those wherein the tertiary amine is a heterocyclic amine, most preferably an imidazole, in particular 1-methylimidazole.

Component (c) of the curable mixtures of this invention, namely the zinc salt of a $C_6-C_{18}$carboxylic acid, is preferably the zinc salt is a linear alkanoic acid such as caproic acid, enanthic acid, caprylic acid, pelargonic acid, capric acid, undecanoic acid, lauric acid, tridecanoic acid, myristic acid, pentadecanoic acid, palmitic acid, heptadecanoic acid or stearic acid, and also a zinc salt of a naphthenoic acid.

In a further embodiment of the curable mixtures of this invention, the zinc salt component of the adduct (c) may also preferably be the zinc salt of a branched $C_6-C_{18}$alkanoic acid, for example of 2-ethylcaproic acid, 2-butylcaprylic acid or 2-hexylcapric acid.

In the curable mixtures of this invention, it is preferred to use the zinc salt of a carboxylic acid of 8 to 12, preferably of 8, carbon atoms, most preferably the zinc salt of caprylic acid.

It is also especially preferred to use the zinc salt of 2-ethylcaproic acid in the curable mixtures of this invention.

A particularly preferred component (c) of the curable mixtures of this invention is the adduct of zinc caprylate and 1-methylimidazole.

Most preferably, component (c) of the curable mixtures of this invention is the adduct of zinc 2-ethylcaproate and 1-methylimidazole.

The adducts (c) are novel and therefore also constitute an object of the present invention.

The adducts (c) of the curable mixtures of this invention are prepared by methods which are known per se, for example by addition of the amine component to the zinc salt of the carboxylic acid at room temperature, with stirring, which addition is made in the presence or absence of a nitrogen atmosphere.

The addition of the amine to the zinc salt of the carboxylic acid is conveniently made in stoichiometric proportion or using a small excess of amine, but preferably in the ratio of 1.05 to 2.5, most preferably of 1.2 to 2.0, mol of amine per mol of zinc salt.

The curable mixtures may also contain components which normally do not participate in the chemical reactions that lead to the cured moulded products. Such fillers are suitably mineral and fibrous fillers such as quartz powder, fused silica, alumina, glass powder, mica, kaolin, dolomite, graphite, carbon black, as well as carbon fibres and textile fibres. Preferred fillers are quartz powder, fused silica, alumina or dolomite. Dyes, pigments, stabilisers and primers as well as other conventional additives can be added to the curable mixtures.

The adducts (c) are very suitable latent accelerators for epoxy resin/carboxylic anhydride systems. They lengthen the pot life (latency) without impairing the short curing times at elevated temperatures, and they also lower the viscosity of the reaction mixture.

The adduct (c) is conveniently added to the epoxy resin/carboxylic anhydride system in amounts of 0.05 to 4.0% by weight, preferably 0.1 to 2.0% by weight and, most preferably, 0.1 to 1.0% by weight, based on the epoxy resin.

The curable mixtures of the invention are used, with or without fillers, as resin systems, especially as casting and impregnating resins.

In the following Examples, all parts and percentages are by weight, unless otherwise indicated.

Example 1

With stirring, 50 parts (ca. 0.5 mol) of 1-methylimidazole are added dropwise over 30 minutes to 100 parts (ca. 0.285 mol) of zinc octoate in a three-necked flask under light nitrogen blanketing. When the addition is complete, the ensuring reaction is exothermic and the temperature of the reaction mixture rises to 65° C. Stirring is continued for 20 minutes, in the course of which the temperature no longer rises.

The formation of the reaction product can be monitored by IR spectroscopy through the occurrence of the pronounced absorption band at 950 cm$^{-1}$, which is not present in the starting materials. The reaction product is a pale yellow liquid of medium viscosity (accelerator 1). Viscosity at 25° C. (according to Hoppler)=1400 mPa·s.

Example 2

237 parts of a commercial epoxy resin based on diglycidyl hexahydrophthalate (ARALDIT CY 184) having an epoxide equivalent of 160 and a viscosity of 800 mPa·s, measured at 25° C., are mixed with 200 parts of hexahydrophthalic anhydride having a hardener equivalent of 154 and which has been liquified by heating. Then 494 g of quartz powder B 300 (ex Sihelco AG, Birsfelden, Switzerland) are stirred into this mixture while heating, and the temperature of the mixture is adjusted to 40° C. The filler content is 66.6%.

The amount of accelerator is so chosen that the gel time of the reaction mixture at 140° C. is 5 to 6 minutes. The requisite amount of accelerator 1 for 120 parts of resin mixture is 0.15 part.

The increase in viscosity at 40° and 25° C. is observed in order to demonstrate the latency (pot life) of the accelerator (q.v. Tables 1 and 2).

TABLE 1

Increase in viscosity as a function of the time at 40° C. measured in mPa.s with a Contraves Rheomat

| | after 0 h | after 2 h | after 4 h | after 8 h | after 15 h | Gel time at 140° C. (Gelimat) |
|---|---|---|---|---|---|---|
| Ex. 2 | 11 400 | 9 400 | 10 000 | 12 400 | 17 700 | 5 min 10 sec |

TABLE 2

Increase in viscosity as a function of the time at 40° C., measure in mPa.s with a Contraves Rheomat

| Accelerator | after 0 days | after 1 day | after 3 days | after 7 days | Gel time at 140° C. |
|---|---|---|---|---|---|
| Example 2 (but stored at 25° C.) | 11 400 | 17 900 | 22 800 | 42 000 | 5 min 10 sec |

What is claimed is:

1. A curable mixture comprising
    (a) at least one epoxy resin containing on average more than one 1,2-epoxy group per molecule,
    (b) at least one cyclic carboxylic anhydride,
    (c) an adduct of a zinc salt of a $C_6$–$C_{18}$carboxylic acid with a tertiary amine, and
    (d) optionally a filler and/or further conventional additives.
2. A curable mixture according to claim 1, wherein the epoxy resin (a) is a polyepoxide compound that contains on average at least two 1,2-epoxy groups per molecule.
3. A curable mixture according to claim 2, wherein the polyepoxide compound is an aliphatic, cycloaliphatic or aromatic polyepoxide, or a mixture thereof.
4. A curable mixture according to claim 1, wherein the cyclic carboxylic anhydride is an alicyclic simple or polycyclic anhydride, an aromatic anhydride or a chlorinated or brominated anhydride.
5. A curable mixture according to claim 4, wherein the cyclic carboxylic anhydride is an alicyclic simple or polycyclic anhydride.
6. A curable mixture according to claim 4, wherein the cyclic carboxylic anhydride is an aromatic anhydride.
7. A curable mixture according to claim 4, wherein the cyclic carboxylic anhydride is a chlorinated or brominated anhydride.
8. A curable mixture according to claim 1, wherein the tertiary amine in the adduct (c) is a heterocyclic amine.
9. A curable mixture according to claim 8, wherein the heterocyclic amine is an imidazole.
10. A curable mixture according to claim 9, wherein the imidazole is 1-methylimidazole.
11. A curable mixture according to claim 1, wherein in the adduct (c) the carboxylic acid from which the zinc salt is derived contains 8 to 12 carbon atoms.
12. A curable mixture according to claim 11, wherein the carboxylic acid from which the zinc salt is derived contains 8 carbon atoms.
13. A curable mixture according to claim 12, wherein the carboxylic acid from which the zinc salt is derived is caprylic acid.
14. A curable mixture according to claim 12, wherein the carboxylic acid from which the zinc salt is derived is 2-ethylcaproic acid.
15. A curable mixture according to claim 1, wherein component (c) is an adduct of zinc caprylate and 1-methylimidazole.
16. A curable mixture according to claim 1, wherein component (c) is an adduct of zinc 2-ethylcaproate and 2-methylimidazole.
17. A curable mixture according to claim 1, wherein component (d) is a mineral and/or fibrous filler.
18. A curable mixture according to claim 17, wherein the filler is quartz powder, fused silica, alumina or dolomite.
19. A curable mixture according to claim 1, wherein the conventional modifiers are selected from dyes, pigments, stabilisers and/or primers.
20. A process for enhancing the latency of epoxy resin/carboxylic anhydride systems by incorporating an adduct of a zinc salt of a $C_6$–$C_{18}$carboxylic acid and a tertiary amine in said systems.

* * * * *